United States Patent [19]
Brown

[11] Patent Number: 5,540,413
[45] Date of Patent: Jul. 30, 1996

[54] AIRCRAFT PRESSURE-FUELING NOZZLE

[76] Inventor: Albert W. Brown, 1207 Pembroke La., Newport Beach, Calif. 92660

[21] Appl. No.: 57,556

[22] Filed: May 6, 1993

[51] Int. Cl.$^6$ .................................................... F16L 29/00
[52] U.S. Cl. ...................... 251/143; 251/149.9; 251/357
[58] Field of Search .................................. 251/143, 149.9, 251/357; 137/614.06, 614.04, 614.03, 614.05

[56] References Cited

U.S. PATENT DOCUMENTS

| | | | |
|---|---|---|---|
| 2,679,407 | 5/1954 | Badger, Jr. | 137/614.06 |
| 4,030,524 | 6/1977 | McMath et al. | 137/614.06 |
| 4,567,924 | 2/1986 | Brown | 141/207 |
| 5,273,071 | 12/1993 | Oberrecht | 137/614.06 |

*Primary Examiner*—Martin P. Schwadron
*Assistant Examiner*—Kevin L. Lee
*Attorney, Agent, or Firm*—Roy A. Ekstrand

[57] ABSTRACT

Described is a set of improvements and added features to the commercial article a nozzle to connect a pressurized fuel carrying hose to a standardized aircraft fueling adapter. The adapter has a spring loaded poppet located centrally in its entrance opening; when that poppet is pushed inward by a poppet on the nozzle fuel can flow into the aircraft tank through an annular opening around both. The nozzle's job is to be easily secured to the adapter in a leaktight manner, then to push the poppets toward the interior of the adapter, and finally to retract, all without any possibility of a fuel leak by mis-assembly or maloperation, in minimum time and often in darkness. The improvements under this invention incorporate usability at lower temperatures, provisions to prevent excessive weight and length of nozzle, making the principal sealing member more easily replaced (with only the fingers), showing the operator when flow of fuel has stopped, and incorporate other changes from field experience having to do with making maintenance and overhaul adjustment-free operation more foolproof on this complex mechanism.

2 Claims, 4 Drawing Sheets

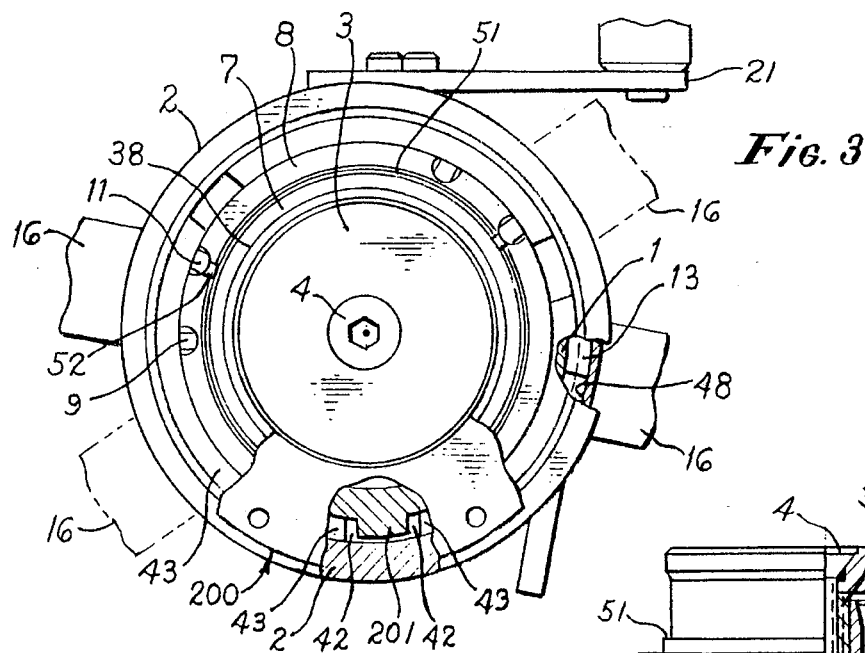
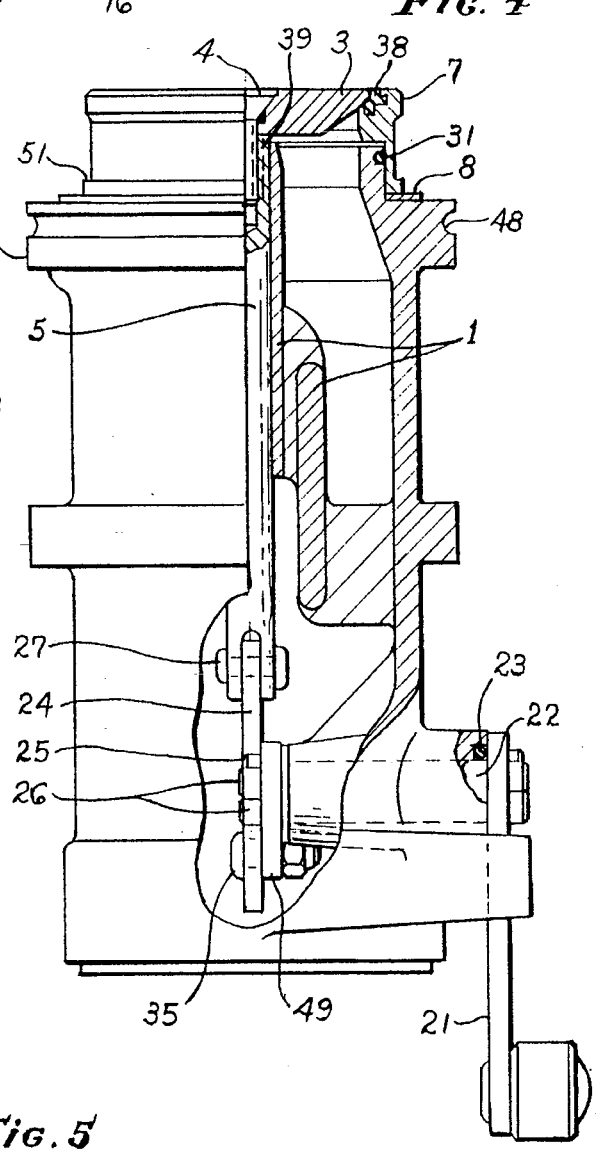
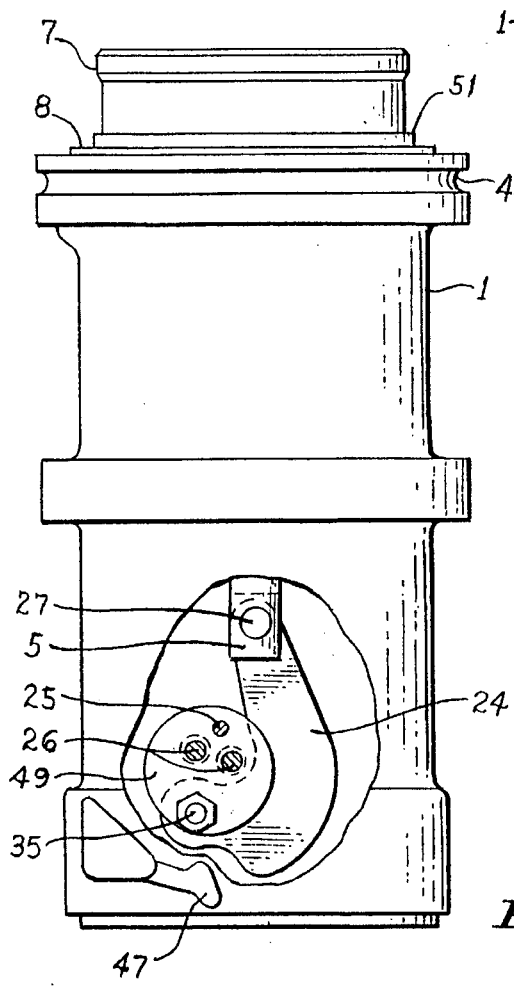
Fig. 3
Fig. 4
Fig. 5

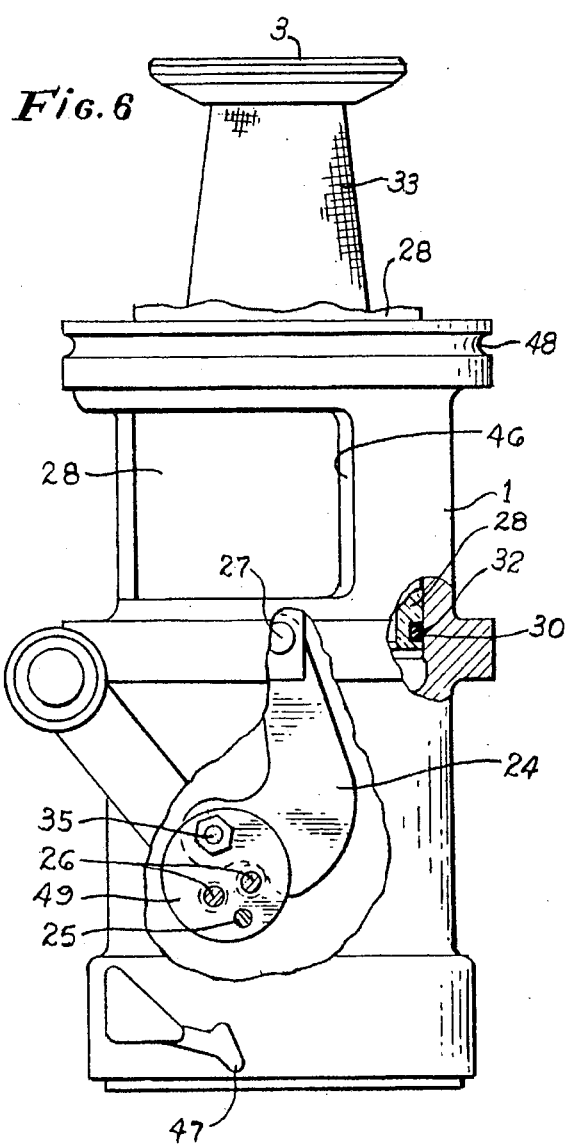
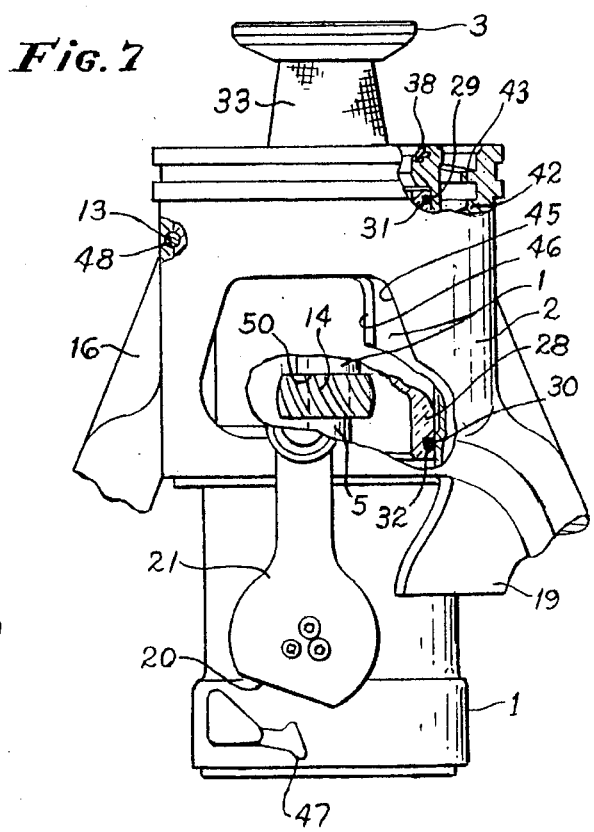
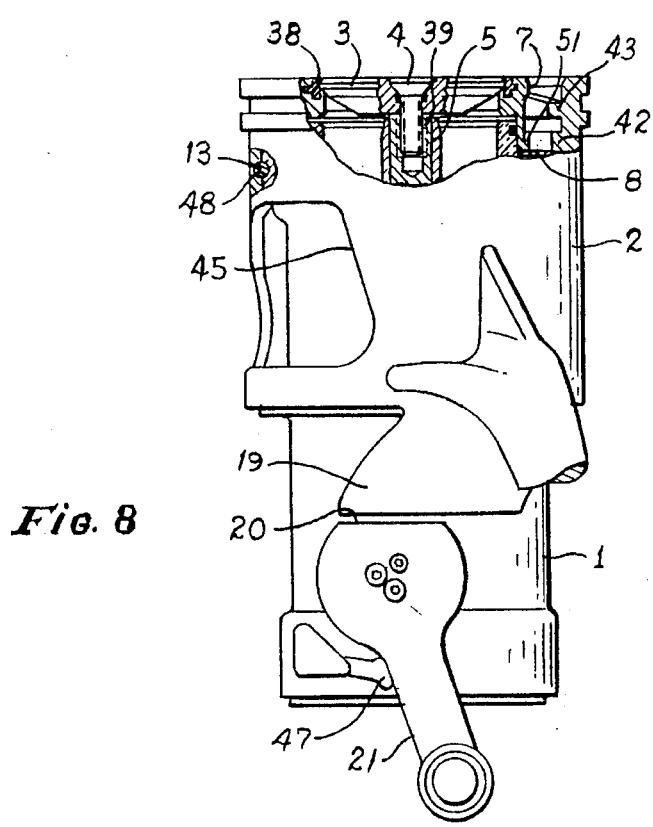

AIRCRAFT PRESSURE-FUELING NOZZLE

BACKGROUND OF THE INVENTION

1. Field of the Invention

To refuel large aircraft, fuel is supplied under pressure through a flexible hose. The invention is the nozzle at the end of the hose, the nozzle having means to attach to an industry standard adapter on the aircraft, and to start and stop flow with minimum time consumed and absolutely minimum spillage.

2. Description of Prior Art

Aircraft fueling nozzles have undergone a large amount of development for many years because the demands made of them are substantial. Demands place a premium on connect and disconnect time, on ruggedness, on weight and length to reduce the load on operators and mating parts, and on reliability.

Because aircraft fueling nozzles employ gaskets and seals having a finite useful life, there exists a continual need for the regular maintenance of the fueling nozzle. This maintenance includes the replacement of worn seals and gaskets. Partial disassembly of the fueling nozzle is generally required to perform the necessary maintenance. This disassembly often involves the separation of tolerance components. After replacement of the worn part, the tolerance components must be reassembled and adjusted within the narrow allowed tolerances to provide for proper functioning of the nozzle.

The reassembly of components to meet the tolerance specifications is time consuming and therefore expensive. In addition, the reassembly of the tolerance components often results in the introduction of errors into the system. The probability of errors being introduced is increased by the repeated need to service the nozzle systems.

In addition, the fueling nozzle is a mechanically complex device which may be serviced only by personnel having substantial training. The complexity of the fueling nozzle partially results from the large number of assembled components. This complexity increases both the probability of the fueling nozzle disfunctioning and the production cost of the fueling nozzle.

A need exists for a fueling nozzle which allows for maintenance procedures without requiring the disassembly of tolerance components. There is also a need for a fueling nozzle which permits the interchangeability of tolerance components without requiring tolerance adjustments of the individual fueling nozzle unit. In addition, there is a need for a reduction in the number of fueling nozzle components, thereby reducing both the introduction of errors into the system and the production cost of the fueling nozzle.

Accordingly, the present invention overcomes the inherent disadvantages in aircraft fueling nozzles of the prior art. The present invention provides a low-cost, easily maintained fueling nozzle, having a reduced number of tolerance components and with additional optional convenience features.

SUMMARY OF THE INVENTION

Since the fuel servicing nozzle has a number of features, only some of which constitute newly-invented components, those components and their contribution to the art will be the only items summarized here.

The principal seal serves two purposes. It stops leakage between the customary poppet and the end of the pressure-bearing wall bounding the fuel passage prior to opening and after closing, and it bridges the leakage path between the nozzle end and the aircraft passage beginning when opened during the fueling operation Although the latter seal surface does not contact the aircraft part when the nozzle collar rotates about its axis as the nozzle is made secure to the aircraft fitting, this seal needs replacement fairly often. The invention is making it self-retaining so a new one can be replaced in its mating part without disassembling anything, by overriding the collar locking pins, and opening the poppet or by removing the poppet and using only one's fingers.

At greater length, the heart of the invention is the two annular rings and the grooves in which the rings nest, as seen integral with Item 38 in FIGS. 1, 4, 7, and 8. Due to the sideways expansion characteristic of elastomers when compressed, this principal seal 38 is self-retaining when it is compressed at either sealing point, unable to slide either vertically or horizontally. When the seal receives no compression from either sealing point, elastomers being flexible by their nature the seal can be removed by hand, without disassembling anything—care being needed only to nest its annular rings in their receiving grooves as shown in all four FIGS. particularly FIG. 4 vs. FIGS 1, 7 or 8.

The prior art required a fitup step to adjust the final axial position of the poppet within prescribed limits. The invention also consists of eliminating the fitup step during reassembly of a torn-down nozzle, saving time and eliminating possible assembly errors which might cause spilled fuel. A composite poppet, shaft and head, separable from and attached to each other with a single thread-locked bolt, makes the tolerances be controlled in the machining and eliminates field fitup and its possible errors, as well as allowing the poppet disc to be removed for access to some nozzle internal parts by the aircraft service crew rather than a trained nozzle assembly mechanic.

One nozzle internal part referred to above is an optional fuel screen which can be placed near the fuel outlet port, making the screen field inspectable when the hose is not pressurized and also cleanable then, and avoiding breaking the hose line at the nozzle inlet and eliminating a disconnect fitting so as to inspect or replace the screen (which is officially not part of the nozzle assembly in the prior art). This improvement to the fueling operation (by putting a removable screen in the nozzle outlet) is another part of the invention.

A second inventive nozzle internal part optionally associated with the screen and the composite poppet is a flow indicator, a spinner which windmills during flow so the operator of the nozzle is directly informed of the aircraft tank's status.

Another nozzle component considered inventive in conjunction with windows or cutaway openings through the metal parts is a section of flow passage made of transparent plastic to permit the mechanic operating the nozzle to examine both the spinner and the screen at any time during fueling or when the nozzle is in the closed position.

Three further component improvements classifiable as inventive are basically aids to the technician doing overhaul or routine maintenance on a nozzle. One is a provision that the retainer springs, which are not prevented from falling out of the holes in the body in which they nest before the last parts are assembled, have their end turns press fitted in the body holes. Another improvement is to use an identical bolt pattern on both ends of the shaft which goes between the crank lever outside the nozzle body and the advance-retract linkage elements located in the center of the fuel passage. The identical bolt pattern permits this shaft to be assembled either-end-out, thus making mis-assembly, which caused problems in prior-art nozzles, impossible. The third is the fitting of three stop pins into holes in the sides of the adapter indexing pins which extend inward and over the flange extending outward from the seal retainer. The purpose of these pins is to limit the downstream motion of the retainer under the force of the retainer springs and prevent it from being forced off the nozzle when the poppet head is removed for screen inspection or cleaning, or replacement of the principal seal. This is illustrated in the drawings, FIGS. 1, 9, 10, 11, and 12. An alternative design would delete the three stop pins 52 and the drilling of holes in adapter indexing pins 11 with protuberances produced on adapter indexing pins 11, extending over flange 51.

These and several non-inventive improvements have resulted in a nozzle without the need for a separate disconnect fitting, hence easier to handle and less prone to convey moment to the industry standard adapter with which the aircraft is fitted. At the same time the machining, number of machine setups, and therefore the cost has been reduced as compared to the prior art.

There are two embodiments of the invention, one being called the standard version and containing only those features described above as essential for function, and a convenience embodiment with the remaining features (i.e., screen, spinner, and window parts to observe screen and spinner).

*Adapter tang 201 is invisible but present in this figure, having depressed the collar lock pin 9 and permitted collar 2 to be rotated so poppet head 3 can be advanced to the flow position.

Figure 2:
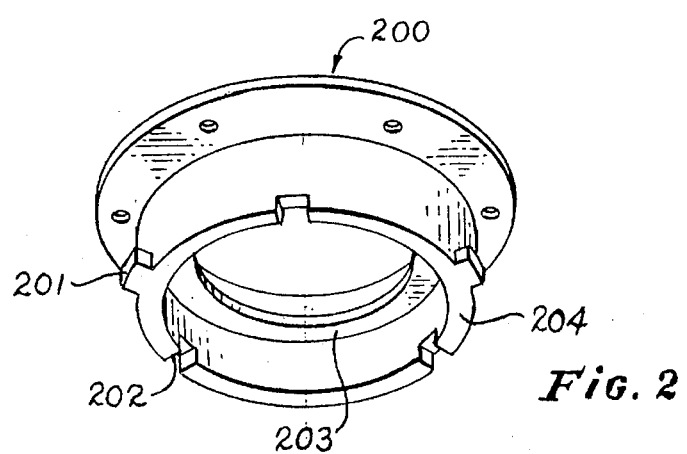

FIG. 2 is a perspective view of the standardized fuel tank adapter with which the nozzle mates non-sealingly before being manually manipulated to and from the nozzle's flow mode.

FIG. 3 is a top view showing parts involved in the mating maneuver and, in phantom, the collar handle position required to allow the poppet to be advanced (flow started).

FIG. 4 shows the exterior elevation of the standard embodiment of the body only, in part cutaway to show cross sections of internal parts in the non-flowing mode.

FIG. 5 is similar to FIG. 4 but at 90° to it. The crank handle of FIG. 4 is toward the observer, but is cut away.

FIG. 6 would be identical to FIG. 5 except the embodiment has changed to the convenience one and the poppet and crank lever are in the flowing position.*

*Adapter tang 201 is invisible but present in this figure, having depressed the collar lock pin 9 and permitted collar 2 to be rotated so poppet head 3 can be advanced to the flow position.

FIG. 7 shows the complete convenience embodiment with collar in place and locally cutaway. The crank lever has partially advanced the poppet.*

*Adapter tang 201 is invisible but present in this figure, having depressed the collar lock pin 9 and permitted collar 2 to be rotated so poppet head 3 can be advanced to the flow position.

FIG. 8 is similar to FIG. 7, except the cutaways show different parts, the embodiment is the standard one, and crank lever and collar are in the flow-lever inoperable poppet-retracted position.

Figure 9:
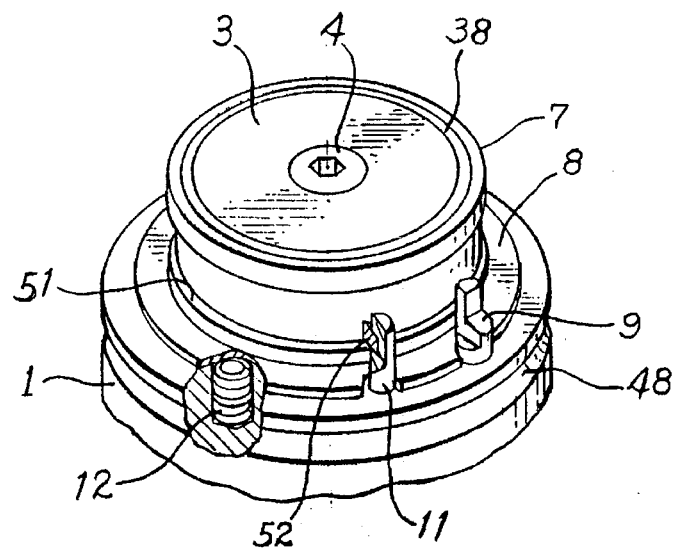

FIG. 9 is a cutaway perspective view of the downstream end of the body of either embodiment, except that only representative collar lock pins, adapter indexing pins and retainer spring are shown with the poppet fully closed.

Figure 10:
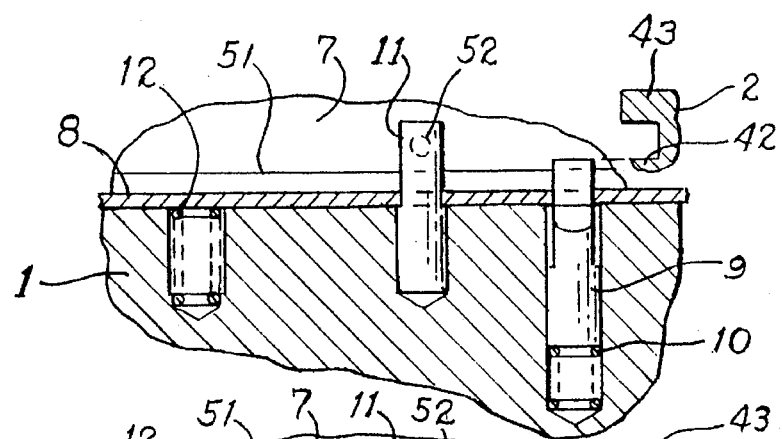

FIG. 10 shows the three elements, two pins and the retainer spring of FIG. 9, in a developed side view as they would be related to other parts when the nozzle is connected to the adapter (regardless of collar rotational position) and flow cannot occur because the poppet is the retracted position.**

Figure 11:
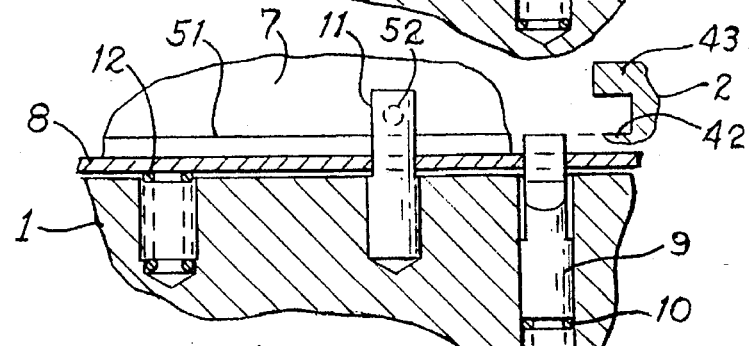

**FIG. 11 applies as soon as poppet head 3 is advanced a small distance and the seal engages the aircraft adapter sealing face.

FIG. 11 shows the three elements of FIG. 10 when flow can occur.*

*Adapter tang 201 is invisible but present in this figure, having depressed the collar lock pin 9 and permitted collar 2 to be rotated so poppet head 3 can be advanced to the flow position.

Figure 12:
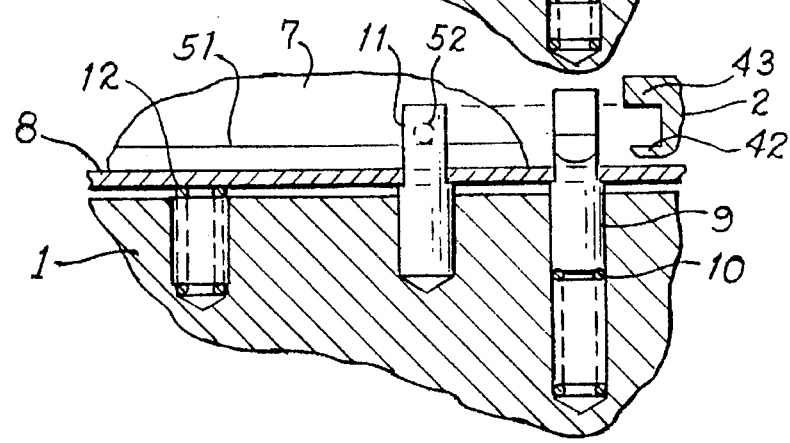

FIG. 12 shows the elements of FIG. 10 in the positions they would assume if the upstream force exerted by the linkage were removed, as by removing the poppet head as can occur during maintenance.

DETAILED DESCRIPTION OF INVENTION

All aircraft fueling nozzles which fill tanks through the standardized fuel tank adapter 200 go through the steps: engagement with adapter, preparation for starting flow, actually advancing the poppet, actually retracting the poppet, and disengagement (which involves reversing the preparation and engagement steps). The mechanical construction being very complex and these five steps comprising four geometric arrangements of the various parts, and my invention having two embodiments, one as simple as possible and the other supplying maximum convenience and information to the operator, the explanation that follows will describe the geometric arrangement of all parts prior to engagement first, then the operational steps together with the various motions of the elements, and finally the convenience features. In some of the figures and discussion irrelevant matter such as convenience features (or basic features) of parts not being discussed appear, unavoidably as 35 USC 112 requires full, clear, and concise disclosure. The convenience embodiment will also be referred to as the window version; silence as to the version indicates features common to both versions.

Figure 1:
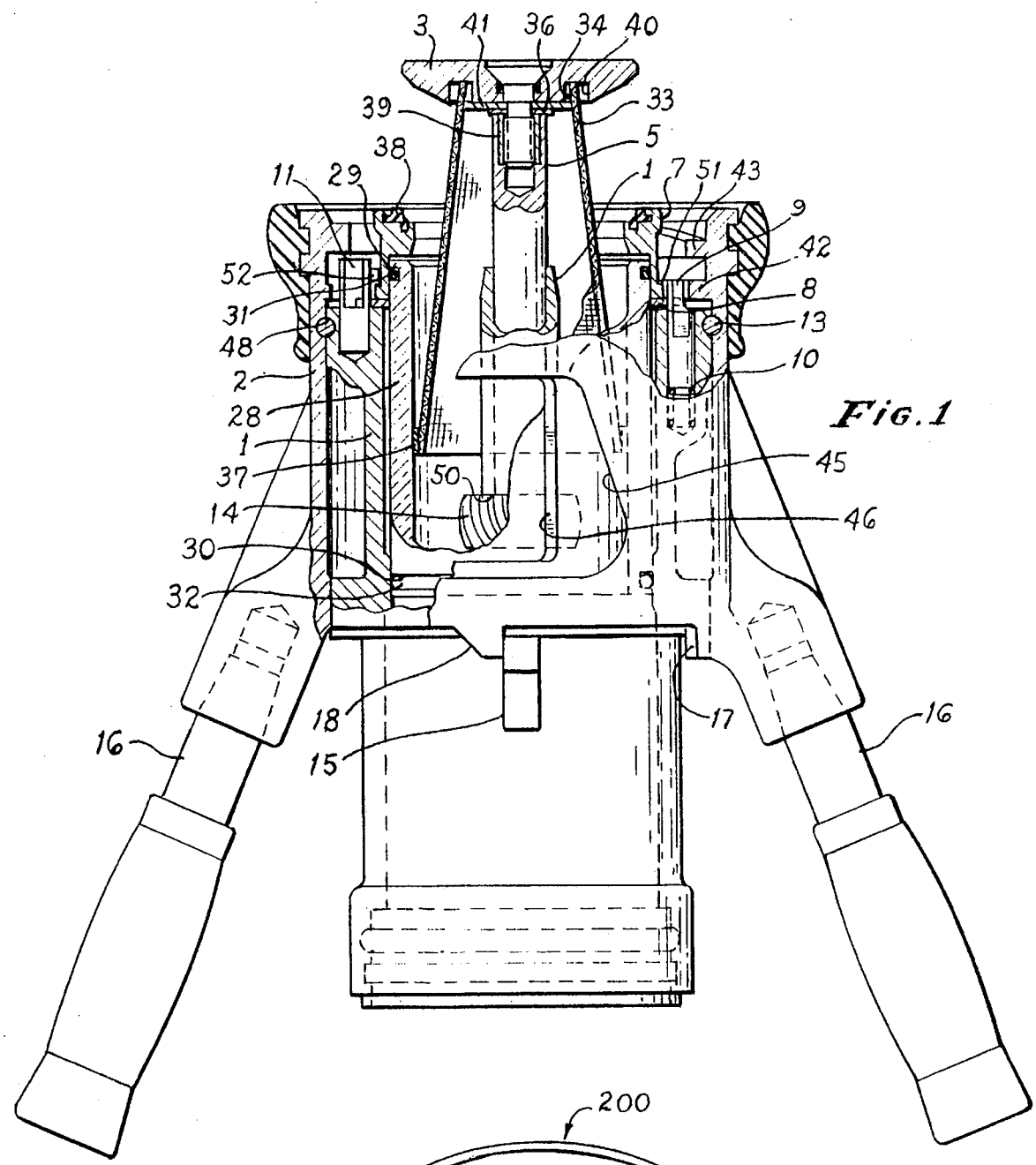
FIG. 1 is an elevation looking at the side of the more convenient embodiment, in the open and flowing position, cut away locally to show the cross section of many of the working parts, most of which also apply to the standard embodiment.*

FIG. 1 shows the body 1, collar 2 and other parts of the window version viewed from the side opposite the crank with the poppet in the fuel-flowing position. The adapter 200, not shown, has depressed collar lock pin 9 in preparation for rotation of collar 2 on body 1, which has to have been completed in order to allow crank lever 21 (shown in FIGS. 4, 7 and 8) to be moved to the flow position where crank lever relief cut 20 escapes collar crank-fixing stop 19. Be it said for clarity that collar 2 surrounds the downstream end of body 1 circumferentially, with the upstream and downstream ends of collar 2 being completely circular.

Prior to engagement, the assembled body 1 and parts are as shown in FIG. 4. Crank lever 21 cannot be accidentally turned as described above, principal seal 38 is sealing to poppet head 3, and the structure poppet bolt 4 and poppet shaft 5 connect the moving parts to body 1. The advance-retract linkage for moving them consists of link 24 attached to poppet shaft 5 by clevis pin 27 and through throw arm 49 to shaft 22, sealed against fuel leakage by shaft seal 23 and attached to crank lever 21 by screws. Principal seal 38 rests sealingly in seal retainer 7, another part of which surrounds and seals to retainer O-ring 31. Outside the fuel boundary as it is, the retainer 7 rests on cutaway ring 8 which rests on retainer spring 12 best shown in FIGS. 9 through 12 and which rest in body 1.

FIG. 2 shows the standardized fueling adapter 200 with three tangs 201, three recessed slots 202, and sealing surface 203 which is pressed upon by principal seal 38 immediately after crank lever 21 starts moving poppet head 3 downstream due to retainer spring force 12.

Referring now to the condition during and after engagement of the nozzle with adapter 200, let it be said that the nozzle is manually pushed into adapter 200 until tangs 201 bottom on adapter tang shelf 42 (tangs 201 entering the gaps between the three adapter tang ledges 43), and collar 2 rotated on body 1 by means of collar handles 16. Tangs 201 slide circumferentially, trapped between adapter tang ledge 43 and adapter shelf 42, until collar rotation stop flow 18 contacts body rotation stop 15 having been moved from being in contact with collar stop no flow 17. The body 1 is kept from following this rotation by the adapter indexing pin 11 having nested in the adapter's recessed slot 202 when the nozzle was manually pushed into adapter 200. The guidance "bearing" for collar 2 on body 1 is collar retaining rod 13 being located in half-groove collar retaining rod 48, one item 48 being in the body 1 opposite another item 48 in collar 2, and collar retaining rod 13 being teflon in the preferred embodiment. When the half-grooves 48 are held opposite each other, collar retaining rod 13 can be inserted or removed through a window in collar 2 connecting 48 to the outside space. This window does not show in any of the drawings.

During rotation of collar 2, principal seal 38 does not contact the sealing surface 203 of airplane tank adapter 200 so as to give long life to principal seal 38, which advances downstream into contact with sealing surface 203 by means of the retainer spring force 12 and when crank lever 21 is moved from the closed-poppet position and the advance-retract linkage driven from its over-center storage and handling position past center and into the late part of its "advance" stroke prior to going overcenter again in the poppet-extended position. As is shown by comparing FIG. 5 (linkage retracted) with FIG. 6 (linkage extended, poppet advanced) the link 24 not only has the appropriate length between end-pivots at clevis pin 27 and linkage pivot pin 35, but the two sides of it are configured so as to be capable of comprising motion stops by making contact with the heads of linkage-stop machine screws 26, the head and thread of which also fasten linkage throw-arm 49 to shaft 22 and thence to crank lever 21 in both preferred embodiments. The nozzle-closed crank stop 47 is preferred to using linkage-stop machine screw 26 in the linkage-retracted position. Fastener machine screw 25 merely fastens. Shaft 22 is sealed by a conventional O-ring joint, shaft seal 23 shown in FIG. 4.

Once the operator has finished fueling the aircraft tanks, the steps taken are reversed: retract the poppet head 3 by manually moving crank lever 21 to its closed position, and rotate collar 2 to its initial position by means of collar handles 16. Disengagement of the fueling nozzle from fueling adapter 200 is assisted, since collar lock pin spring 10, upstream from collar lock pin 9 and shown in its compressed position in FIG. 1, forces collar lock pin 9 against adapter rim 204 (absent from FIG. 1) which then moves the body 1 in the upstream direction, adapter tangs 201 passing through the spaces between the three adapter tang ledges 43 as soon as body rotation stop 15 is contacted by collar stop-no flow 17.

The motions and functions of the pins 9 and 11, visible along with poppet head 3, seal retainer 7 and cutaway ring 8 in FIG. 3, are best explained by FIGS. 9, 10, 11, and 12. (Retainer spring 12 is concealed by cutaway ring 8 in FIG. 3.) FIG. 9 shows the downstream end region of the body in perspective with "mouse cuts" down the axis of adapter indexing pin 11 and exposing retainer spring 12. In FIGS. 10, 11, and 12, only one of each element is shown, although the preferred embodiment consists of three equally spaced pins, three collar lock pin springs 10, and four equally spaced retainer springs 11, all either captured by or acting on the one cutaway ring 8 on which seal retainer 7 rests. Elevation of associated parts which control the axial positions of pins 9 and 11 (also called the auxiliary pins).

FIG. 10 depicts the positions of the five movable parts (moving with respect to body 1) when adapter 200 has tangs 201 bottomed on adapter tang shelf 42, regardless of collar 2's rotational position, and crank lever 21 is in its closed (poppet retracted) position. As soon as crank lever 21 passes a rotational position on the advance stroke corresponding to its rotational overtraveled position, retainer springs 12 move cutaway ring 8 downstream until their force is balanced by force proceeding from sealing surface 203 through principal seal 38 and seal retainer 7 to cutaway ring 8. This balance point produces the element positions shown in FIG. 11, and persists until fueling is complete and the nozzle prepared to be disconnected from the adapter 200, at which time the elements assume the positions shown in FIG. 10. Disconnection from adapter 200 is prevented by collar crank-fixing stop 19 hitting crank lever 21 anywhere other than at the crank lever relief cut 20.

The retainer spring 12 is always compressed somewhat as long as collar retaining rod 13 keeps it from moving the entire collar downstream. Maximum compression occurs when crank lever 21 is slightly short of nozzle-closed crank stop 47, when the advance-retract linkage passes maximum travel and pulls poppet head 3 upstream beyond its at-rest location two hundredths of an inch or so, not enough to over-compress principal seal 38. This condition, and the poppet-closed rest position as well, is shown in FIG. 10, retainer flange 51 and cutaway ring 8 being pulled upstream by forces from the advance-retract linkage until they are in contact with body 1. The segment-shaped shoulders on adapter indexing pin 11 are at or below the upstream face of cutaway ring 8; those of collar-lock pin 9 are far below (upstream from) cutaway ring 8 since the downstream end of pin 9 is forced upstream by surface 204 when adapter tang 201 is between adapter tang shelf 42 and adapter ledge 43.

Retainer spring 12 has slightly less than maximum compression in the condition shown in FIG. 11, which obtains when the parts are in the fueling position. Retainer 7 moves downstream until principal seal 38 presses against adapter sealing surface 203 hard enough to both balance the force exerted by retainer spring 12 and to prevent fuel leakage in a lateral direction. As shown, both the pins remain where they were in FIG. 10.

FIG. 12 shows the same parts, but without any upstream force being applied to retainer 7 through principal seal 38 either from adapter sealing surface 203 or via the advance-retract linkage pulling poppet disc 3 upstream. Retainer springs 12 act against cutaway ring 8 and move it downstream until the downstream end of adapter indexing pin 11 bottoms against adapter tang ledge 43. (Pin 11 is forced downstream by forces going from springs 12 to ring 8 to retainer 7 to flange 51 to stop pins 52 to adapter indexing pin 11.) There exists also a small downstream force on cutaway ring 8 from collar-lock springs 10 via the segment-shaped shoulders on collar-lock pin 9.

Retainer O-ring groove 29 exists in both nozzle embodiments. In the standard version of the nozzle, it is machined and constructed as part of body 1, and encloses retainer O-ring 31. In the convenience embodiment, the groove geometry and O-ring are identical to that of the standard version, but retainer O-ring grove 29 is machined into transparent discharge spool 28. The situation is made clear by comparing the pertinent region of FIGS. 4 and 5 with FIG. 1.

Returning to FIG. 1 as it applies to both embodiments, first cutaway opening 45 in collar 2 exists in both as it reduces weight and cost even if it is not used for visual access to the fuel passage, screen 33, and spinner 14 when the advance-retract linkage is advanced. Also helicoil 39 which permits one poppet bolt 4 to attach poppet head 3, whichever version of item 3 is used, to poppet shaft 5 with the precision needed to seal on principal seal 38, is common to both embodiments. And body rotation stop 15 assembles between collar stop flow 18 and collar stop non-flow 17 in both versions of the nozzle.

The poppet head 3 shown in FIGS. 4, 5 and 8 completes the description of the simpler embodiment. The convenience embodiment or window version includes discharge spool 28 made of transparent plastic and sealed to body 1 by spool O-ring groove 30 in which rests O-ring 32, and having retainer O-ring groove 29 and retainer O-ring 31 at its downstream end. Items 29 and 31 are identical in construction and function to those of the simpler embodiment (where they are fabricated as part of body 1). Second cutaway opening 46 is better displayed in FIGS. 6 and 7. It is visible through first cutaway opening 45 at any collar 2 rotational position.

Screen 33 surrounding poppet shaft 5 and spinner 14 (mounted on poppet shaft 5 between clevis pin 27 and the part of body 1 which guides poppet shaft 5) complete the convenience features of the window version nozzle. Convenience in inspecting, cleaning, or replacing screen 33 may be had by virtue of its being partly exposed and easily removed with poppet head 3 since screen 33 mounts to poppet head 3 in screen mount recess 40 using downstream closure ring 34, snap ring 36, and screen retaining washer 41. This mounting allows enough floating motion to enable upstream closure ring 37 to position itself freely in discharge spool 28. Spinner bearing surface 50 shown in FIG. 1 may be formed on the part of body 1 which guides poppet shaft 5 or may be a teflon washer inserted at that point depending on the desirability of observing low flow rates for any given application of the nozzle. In the preferred embodiment, spinner rotational torque is sufficient to rotate it at flows of 5 to 10 gallons per minute without any friction-reducing provisions, using an unsophisticated spinner design consisting of helical vanes protruding from a short section of plastic tube into the fuel streaming by, the inner diameter of the plastic tube being mounted on poppet shaft 5 and stopped from moving downstream by spinner bearing surface 50, which is at right angles to the axis of poppet shaft 5.

The invention having been described in its preferred embodiments, it is clear that those skilled in the art can make modifications without exercise of the inventive faculty. Therefore, the scope of the invention is defined as the scope of the following claims:

I claim:

1. An aircraft fueling nozzle of the type attaching to the standardized fueling adapter, the adapter having a spring loaded central poppet valve member which the fueling nozzle poppet, advancing, forces downstream during fueling, the fueling nozzle poppet (henceforth called the poppet) when retracted to its own seat connected to structure on the fueling nozzle body closes the fuel flow passage within body, fittings, and fuel supply hose, said fueling nozzle body having a manually operated crank on an external surface the turning of which twists a leak-sealed shaft and operates an advance-retract linkage located in the fuel stream and, through a clevis on the poppet shaft, controlling the poppet position, the the manually operated crank being blocked to prevent poppet advancement unless the nozzle is properly attached to the standardized fueling adapter, in which the improvement comprises:

an interface seal made of elastomer and surrounding the poppet head and having two sealing surfaces, one to the poppet and one to the standardized fuel tank adapter, and two integral annular raised rings, one engaging an internal slot on the retaining member radially outward from said interface seal and the other engaging a similar slot in the member which established the axial position of said interface seal and seals against radial leakage, whereby said interface seal, though flexible, cannot slide either axially to the fuel flow direction or radially when either sealing surface is compressed, can be flexed and removed without tools when neither sealing surface is compressed, and is held by the two integral radial rings during any transient which occurs as the active sealing surface changes; although total relaxation of compression on said interface seal would cause fuel leakage and is not permissible, so is otherwise provided for, using control of tolerances on aircraft fueling nozzle parts, the tolerances on standardized fueling adapter parts being standardized.

2. Apparatus as in claim 1, further comprising:

a poppet constructed of a separable head portion and shaft portion, held by a single flat-head bolt the threads of which extend upstream from beneath the poppet head and engage a self-locking threaded insert at the downstream end of a poppet shaft, whereby said interface seal can be replaced by separating said poppet head portion and removing it to expose said interface seal without advancing said poppet by means of the advance-retract linkage.

\* \* \* \* \*